Dec. 24, 1935.  B. LEWIS ET AL  2,025,599
WINDSHIELD
Original Filed March 26, 1930  2 Sheets-Sheet 1

Inventors
Bennett Lewis
and Harold F. Howard
By Bacon & Thomas
Attorneys

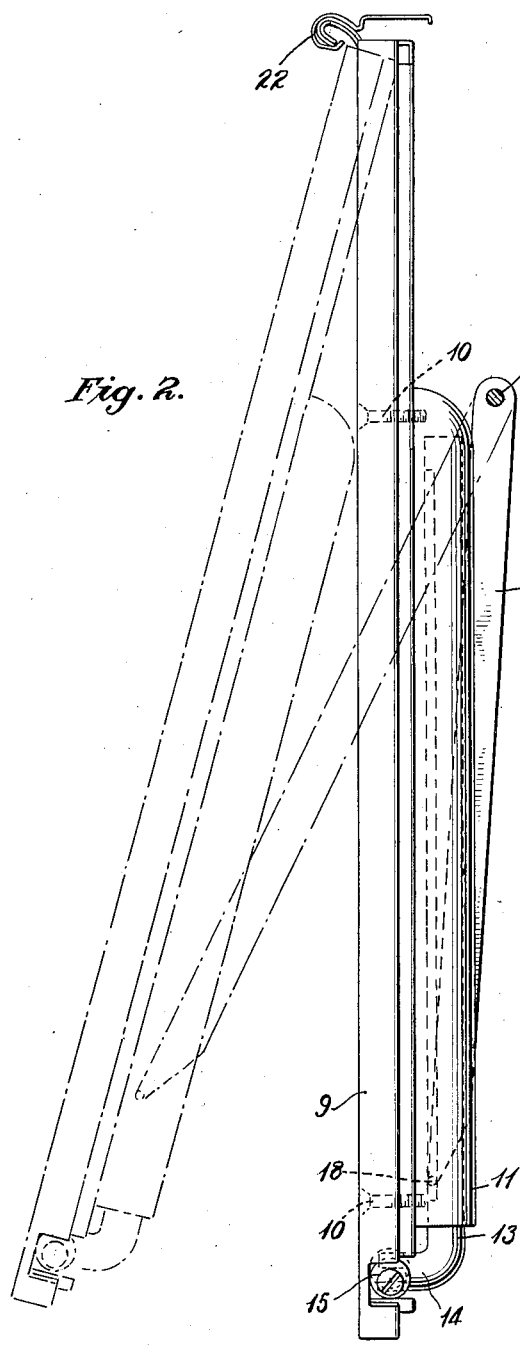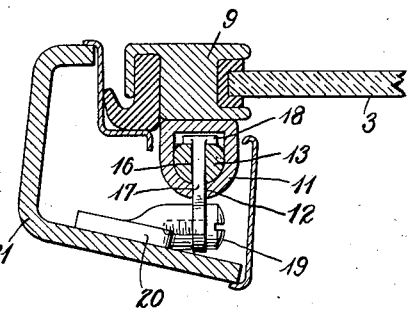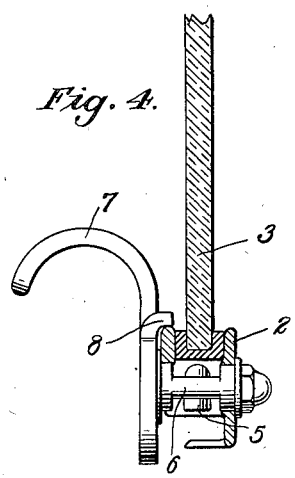

Patented Dec. 24, 1935

2,025,599

UNITED STATES PATENT OFFICE 2,025,599

WINDSHIELD

Bennett Lewis and Harold F. Howard, Indianapolis, Ind., assignors to Martin-Parry Corporation, York, Pa., a corporation of Delaware Application March 26, 1930, Serial No. 439,138
Renewed August 3, 1935

10 Claims. (Cl. 296—84)

This invention relates to windshields for motor vehicles and more particularly has reference to windshields of the character which are swingably or pivotally supported at their upper edges.

It is an object of the invention to provide locking mechanism for rigidly and securely holding a windshield in any desired position, the entire locking mechanism and its control being disposed outside the line of vision through the windshield.

A further object of the invention resides in the provision of a locking device for windshields which, with the exception of the control mechanism, is entirely concealed behind the side frame members of the windshield without encroaching upon the area of vision through the windshield.

It is a still further object of the invention to provide locking mechanism of the character set forth which is adaptable for mounting upon the frame of any type of pivoted windshield without affecting the design or increasing the cost of the frame.

Still another object of the invention is to provide locking mechanism which will rigidly hold the windshield in any adjusted position without vibration due to wind pressure or motion of the vehicle.

A further object of the invention resides in the provision of a windshield locking device which is freely and separately adjustable at both ends to give greater or less locking action and to compensate for wear of parts of the device.

Still another object of the invention is to provide locking mechanism of the nature referred to which is simple in construction, efficient in operation, and economical in manufacture.

Other objects and advantages of the improved windshield locking device will appear from the more detailed description thereof.

For a fuller understanding of this invention reference will be had to the accompanying drawings illustrating one preferred embodiment but it is to be understood that the invention is not to be construed as limited to the specific showing of the drawings.

In the drawings, Fig. 1 is a fragmentary front view of a known windshield construction having this improved locking mechanism applied thereto, the mechanism being shown in the locked position;

Fig. 2 is an end view of the construction shown in Fig. 1 and illustrating in dotted line an adjusted position of the device;

Fig. 3 is a cross-sectional view taken on a line through the upper portion of the supporting arm and showing its pivotal connection to the body pillar of a vehicle; and Fig. 4 is a cross-sectional view through the control mechanism and is taken on the line 4—4 of Fig. 1.

Throughout the several views of the drawings like reference characters indicate like elements of construction.

Figure 1:
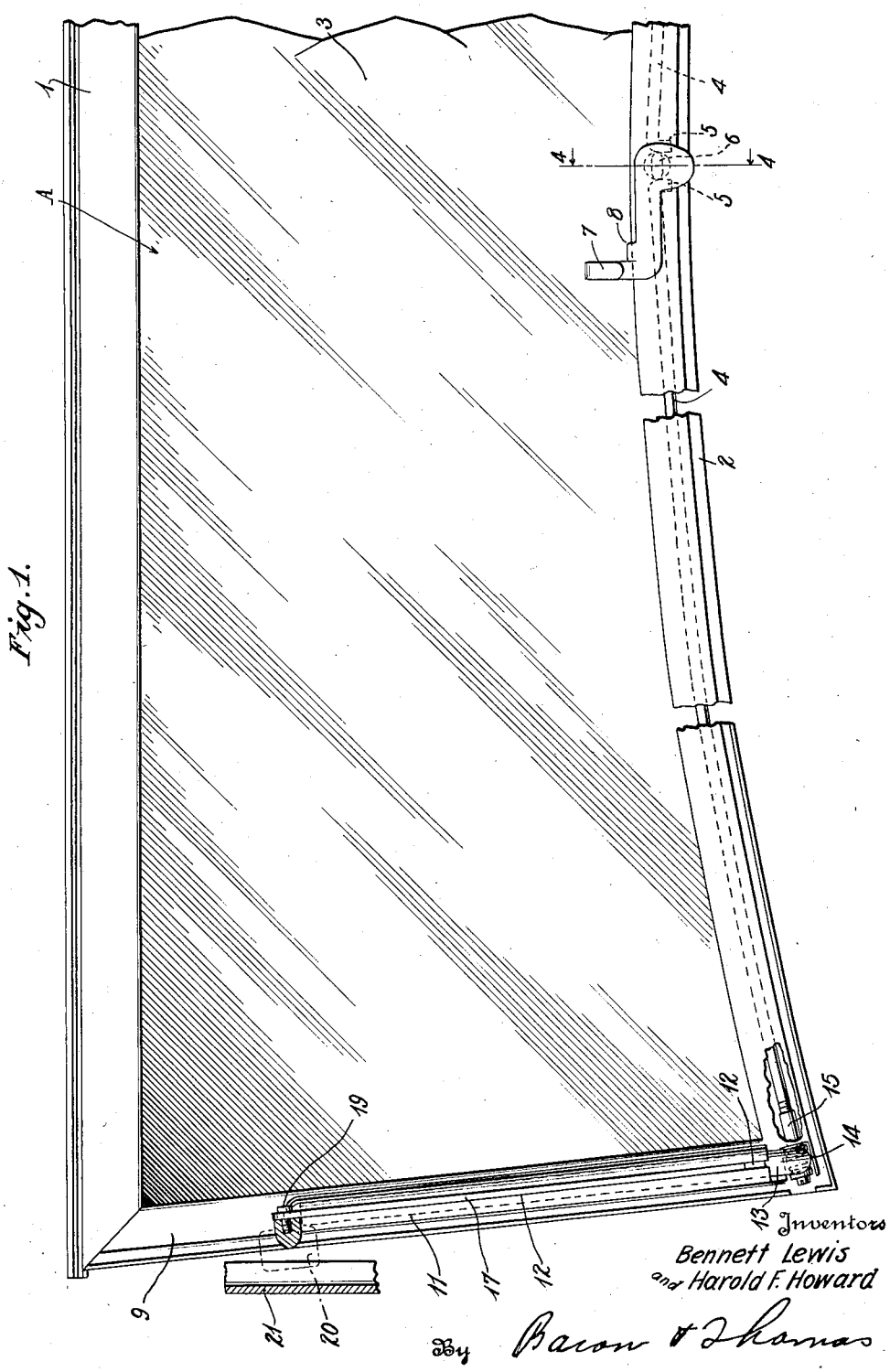

Referring more particularly to the drawings, at A is indicated generally a windshield having upper frame member 1, lower frame member 2, and window 3 therebetween. In the lower frame member 2 is supported a pair of rods 4, the opposed ends of which are bent over as shown at 5. Between and in contacting relation with the ends 5 is positioned a cam 6 which is securely and rigidly fastened to a rotatable handle and central operating control 7 having a stop member 8.

Fixed to the windshield side frame member or channel 9, by means of screws 10, is a casing 11 having a slot 12 extending longitudinally thereof. A shaft 13 is disposed within the casing 11, said shaft being adapted for slight rotational movement on its axis within the casing. The lower end of shaft 13 protrudes from the casing and is bent inwardly toward side channel 9 as shown at 14, the extension 14 of shaft 13 being bifurcated to receive collared bushing 15 screw threaded, as shown, onto the outer end of one of the rods 4 and freely adjustable thereon. The portion of shaft 13 within the casing is cut longitudinally (see Fig. 3) to provide a slot 16 therethrough equal in width to slot 12. Positioned for sliding movement within slot 12 of the casing and slot 16 of the shaft is a supporting arm or brace 17 provided with projections 18 at its inner lower end to prevent the lower end of arm 17 from being withdrawn through the slots. It will thus be seen that arm 17 passes through and is in contact with the edges of both slots 12 and 16 and is free to move lengthwise thereof while the lower end of the arm is at all times retained in the slots by virtue of projections 18.

The upper end of arm 17 is pivoted on and securely held by screw 19 mounted on bracket 20 which in turn is rigidly fastened to body pillar 21 of the vehicle, the entire windshield A being swingable on its pivot 22 as indicated in Fig. 2.

In operation, it will be seen that rotation of cam 6, by means of handle 7, through an angle of approximately 90° from the position shown in Fig. 1 releases the pressure on rods 4 whereupon the mechanism is placed in free or unlocked position and arm 17 is free to swing inwardly and outwardly about bearing screw 19 and to slide in slots 12 and 16 of casing 11 and shaft 13 respectively. In this unlocked condition the windshield may be swung into any desired position about its pivot 22. The windshield having been properly adjusted, cam 6 is now rotated through handle 7 back into the position shown in Fig. 1, this action causing rods 4 to move outward toward the sides of the windshield and to exert and maintain a force or pressure on the lower end 14 of shaft 13 tending to rotate the latter about its axis in casing 11. Such axial movement of the shaft in the casing causes arm 17 to be pressed or bound between one edge of slot 16 in the shaft and the opposite edge of slot 12 in the casing, the resultant pressure furnishing sufficient friction to prevent arm 17 from being moved lengthwise in the slots. Movement of the windshield is thus prevented and the same is accordingly firmly locked in the desired adjusted position.

By reason of the bushings 15 on the opposite ends of rods 4, the mechanism is freely and separately adjustable at both ends to give greater or less locking action and to compensate for wear of the parts of the device. The stop member 8 on handle 7 is provided to limit the movement of the latter to the necessary operating arc.

From the foregoing it will be seen that we have devised mechanism for rigidly locking a windshield in adjusted position, the entire device, except for control handle 7, being concealed by the frame or channel members of the windshield and all parts disposed out of the line of vision through the latter, the mechanism being simple in construction and operation.

Although we have illustrated and described the invention with considerable particularity, it is to be understood that various changes and modifications may be made therein without departing from the spirit and scope of the invention as defined in the appended claims.

What we claim is:

1. The combination with a pivotally mounted windshield having a side channel, of a shaft disposed vertically of said channel, a longitudinal slot in said shaft, a pivoted supporting arm slidable in said slot and having its lower end retained in said slot, and means for exerting and maintaining a rotational force on said shaft to bind said arm in said slot.

2. The combination with a pivotally mounted windshield having a side channel, of a vertical casing fixed to said channel, a slot in said casing extending from the lower to the upper portion thereof, a shaft in said casing having an angular extension protruding through the lower end of said casing, the portion of said shaft within said casing having a slot corresponding to the slot in the casing, a pivoted supporting arm slidably mounted in said slots, means for retaining the lower end of said arm in said slots, a rod disposed longitudinally of the lower portion of said windshield and engaging said extension, and means for forcing said rod outwardly in the direction of said channel and for releasably holding the same in such position.

3. The combination with a body pillar of a vehicle and a pivotally mounted windshield having a side channel, of a shaft disposed vertically of said channel, a longitudinal slot in said shaft, a supporting arm pivotally fixed at its upper end to said pillar and slidable in said slot, means for retaining the lower end of said arm in said slot and means for exerting and maintaining a rotational force on said shaft to firmly hold said arm in said slot.

4. The combination with a body pillar of a vehicle and a pivotally mounted windshield having a side channel, of a vertical casing fixed to said channel, a longitudinal slot in said casing, a shaft loosely mounted in said casing and having a slot in alignment with the slot in said casing, a supporting arm pivotally fixed at its upper end to said pillar and slidable in said slots, means for retaining the lower end of said arm in said slots, a control handle on the lower portion of said windshield at a point remote from said channel, and means cooperating with said handle for exerting and maintaining a rotational force on said shaft.

5. The combination with a pivotally mounted windshield having a side channel, of a shaft disposed vertically of said channel, a longitudinal slot in said shaft, a pivoted supporting arm slidable in said slot and having its lower end retained in said slot, an angular extension at the lower end of said shaft, a rod disposed longitudinally of the lower portion of said windshield, an adjustable bushing joining said rod with said extension, and means for forcing said rod outwardly toward said channel and for releasably holding the same in such position.

6. Retaining means for a pivoted closure member comprising an elongated element having a slot formed therein to extend longitudinally thereof and transversely therethrough, a bracing arm passing entirely through said slot, and means for rotating said slotted element to cause binding of the arm in the slot.

7. Retaining means for a pivoted closure member comprising an elongated element having a slot formed therein to extend longitudinally thereof and transversely therethrough, a bracing arm passing entirely through said slot, means for rotatably supporting said element and for restraining movement of the arm transversely of the element, and means for rotating said slotted element to cause binding of the arm in the slot.

8. Retaining means for a pivoted closure member comprising an elongated element having a slot formed therein to extend longitudinally thereof and transversely therethrough, a bracing arm passing entirely through said slot, means for rotatably supporting said element and for restraining movement of the arm transversely of the element in one direction, means carried by the arm for restraining transverse movement of the same in the opposite direction with respect to said element, and means for rotating said slotted element to cause binding of the arm in the slot.

9. The combination with a pivotally mounted windshield having a side channel, of a shaft having a longitudinal slot disposed vertically of said channel, a pivoted supporting arm having at one end means slidable in said shaft slot and means for retaining said first-mentioned means in said slot, said shaft and the means slidable in said slot being constructed and arranged to effect holding and releasing of said slidable means when said shaft is rotated in opposite directions, and manually operable means for rotating said shaft in one direction.

10. The combination with a pivotally mounted windshield having a side channel, of a shaft having a longitudinal slot disposed vertically of said channel, a pivoted supporting arm having at one end means slidable in said shaft slot and means for retaining said first-mentioned means in said slot, said shaft and the means slidable in said slot being constructed and arranged to effect holding and releasing of said slidable means when said shaft is rotated in opposite directions, a handle carried by said windshield to act as a grip for effecting opening and closing movements of said windshield, and means operatively connected to said handle and said slotted shaft for effecting rotation of said shaft when the handle is moved relative to said windshield.

BENNETT LEWIS.
HAROLD F. HOWARD.